(12) United States Patent
Peyrin et al.

(10) Patent No.: US 8,088,626 B2
(45) Date of Patent: Jan. 3, 2012

(54) CHIRAL SELECTORS FOR SEPARATING ENANTIOMERS OF A COMPOUND

(75) Inventors: Eric Peyrin, Saint Egreve (FR);
Jean-Luc Decout, Vaulnaveys le Haut (FR); Corrine Ravelet, Lancey (FR); Isabelle Henriette Baussanne, Lans en Vercors (FR)

(73) Assignee: University Joseph Fourier (Grenoble 1), Grenoble (FR)

( * ) Notice: Subject to any disclaimer, the term of this patent is extended or adjusted under 35 U.S.C. 154(b) by 171 days.

(21) Appl. No.: 12/530,795

(22) PCT Filed: Mar. 13, 2008

(86) PCT No.: PCT/FR2008/000327
§ 371 (c)(1),
(2), (4) Date: Jan. 27, 2010

(87) PCT Pub. No.: WO2008/132340
PCT Pub. Date: Nov. 6, 2008

(65) Prior Publication Data
US 2010/0144045 A1  Jun. 10, 2010

(30) Foreign Application Priority Data
Mar. 14, 2007  (FR) ...................................... 07 01846

(51) Int. Cl.
*G01N 33/00* (2006.01)
*C07D 309/00* (2006.01)
*C07D 315/00* (2006.01)
*C13K 13/00* (2006.01)
*C08B 37/00* (2006.01)
*C07G 3/00* (2006.01)
*C07H 1/00* (2006.01)
*C07H 21/00* (2006.01)
*A61K 38/00* (2006.01)

(52) U.S. Cl. ............ 436/86; 436/94; 549/356; 549/416; 526/123.13; 526/18.7; 526/4.1; 526/123.1; 526/25.4; 530/344; 562/400

(58) Field of Classification Search ................... 436/86, 436/94; 549/356, 416; 536/123.13, 18.7, 536/4.1, 123.1, 25.4; 530/344; 562/400
See application file for complete search history.

(56) References Cited

U.S. PATENT DOCUMENTS
4,469,875 A    9/1984  Busker et al.

FOREIGN PATENT DOCUMENTS
WO  2005060573 A2  7/2005

OTHER PUBLICATIONS

Riguet et al., "A Route for Preparing New Neamine Derivatives Targeting HIV-1 TAR RNA", Tetrahedron, Elsevier Science Publishers, Amsterdam, NL, 60(37):8053-8064 (2004).
Zaher et al., "Copper(II) Complexes of Lipophilic Aminoglycoside Derivatives for the Amino Acid Enantiomeric Separation by Ligand-Exchange Liquid Chromatography", J Chromatography, Elsevier Science Publishers B.V. Amsterdam, NL, 1185(2):291-295 (2008).

*Primary Examiner* — Vickie Kim
*Assistant Examiner* — Dwan A Gerido
(74) *Attorney, Agent, or Firm* — Porzio, Bromberg & Newman, P.C.

(57) ABSTRACT

The invention relates to the use of compounds as new chiral selectors for separating the optical or enantiomeric isomers of a compound, wherein the chiral selector comprises at least one compound of formula (I): and at least one metal ion, for example $Cu^{2+}$, $Ni^{2+}$, $Zn^{2+}$, $Cd^{2+}$ or $Co^{2+}$.

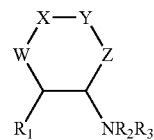

(I)

15 Claims, 6 Drawing Sheets

CHIRAL SELECTORS FOR SEPARATING ENANTIOMERS OF A COMPOUND

CROSS REFERENCE TO RELATED APPLICATION

This is a National Stage of International Application PCT/FR2008/000327, filed 13 Mar. 2008, which claims the benefit of Application No. 0701846, filed in France on 14 Mar. 2007, the disclosures of which Applications are incorporated by reference herein.

The present invention relates to techniques of separating optical isomers. The invention provides for the use of compounds as new chiral selectors.

Chirality may be defined as a structural characteristic which means that a molecule or a compound is asymmetric and cannot be superimposed on its image in a mirror. The molecules exhibiting this characteristic are called optical isomers or enantiomers.

An enantiomer is a configurational isomer which can be superimposed on its homolog after symmetry in a mirror. Enantiomers are isomers in which the attachment order of the atoms in the molecule is identical but in which the spatial distribution is such that they are the mirror image of one another, and therefore cannot be superimposed.

The present invention uses new compounds as chiral selectors for separating optical isomers or enantiomers of a compound. These new compounds exhibit a greater affinity for one of the enantiomers to be separated. They are therefore capable of retaining or adsorbing specifically one of the enantiomers to be separated. Affinity means the reciprocal chemical attraction of two substances.

A chiral selector is an optically active reagent which is capable of reacting, recognizing, binding to or adsorbing specifically to one of the optical isomers or enantiomers of a compound, and hence separating one enantiomer of a compound relative to another enantiomer of that same compound.

Chromatographic and electrophoretic techniques of chiral separation are used for the separation, purification and quantification of enantiomers, more particularly in order to separate, purify, and quantify one enantiomer of a compound relative to another enantiomer of that same compound. These techniques involve the use of chiral selectors, capable of reacting, recognizing, binding to or adsorbing specifically to one of the optical isomers or enantiomers of a compound, and hence separating one enantiomer of a compound relative to another enantiomer of that same compound. These chiral selectors must exhibit certain properties, and in particular they must have the capacity to recognize their target with high specificities and affinities.

The chiral selectors are specific for particular separation techniques. Chiral separation based on ligand exchange was introduced in the 1970s by Davankov. Among all of the available chiral selectors, only certain compounds are nowadays used in ligand exchange, in particular, and primarily, amino acid/metal ion complexes, which are described as possible selectors in chiral ligand-exchange chromatography (Davankov, J. Chromatogr. A, 2003), and also the chitosan/metal ion complex (Liu Y et al., J. Sep. Sci., 2006).

The use of amino acid/metal ion complexes or chitosan/metal ion complexes as chiral selectors in separation based on ligand exchange presents a number of disadvantages. Firstly, the functionalization of the amino acids or the chitosan is limited owing to the small number of reactive functions available on these compounds. This results in a general limitation on their uses. Moreover, owing to this small number of reactive functions, it is not possible, for example, to modulate the selectivity or to reverse the order of elution of the enantiomers by displacing a moiety on said amino acid or chitosan. Furthermore, the amino acids do not allow the separation of enantiomers from nucleosides, which are nowadays being used more and more, in particular by the pharmaceutical industry.

One object of the present invention is therefore to provide chiral selectors which offer more possibilities for functionalization, in other words different points of attachment for modulating the interactions both with the enantiomer to be separated and with the solid support in the case of a chiral stationary phase.

Another object of the invention is to provide chiral selectors which offer greater flexibility in use, with a view to optimum separation of compounds.

Another object of the invention is to provide chiral selectors which offer the possibility of reversing the order of elution of the enantiomers. Reversing the order of elution is advantageous for determining the enantiomeric purities and for eluting first of all the enantiomer which is present in a small amount.

Yet another object of the invention is to provide a chiral selector which is capable of separating all of the enantiomers of amino acids, peptides, dipeptides, tripeptides, etc., amino alcohols, alcohol acids, and nucleosides, and which is typically dedicated to these chemical classes.

Another object of the invention is to provide a method of separating the enantiomers of a number of compounds using a single type of chiral selector.

Yet another object of the invention is to provide a chiral selector which is inexpensive, easy to use, and highly performing, all at the same time.

Another object of the invention is to provide a chiral selector employing different metal ions in order to modulate the enantioselective properties of the ligand.

Yet another object of the invention is to provide a chiral selector which can be used in different separation techniques (chromatography and capillary electrophoresis in particular).

Accordingly the present invention in a first aspect relates to a chiral selector for separating the enantiomers of a compound, said chiral selector comprising:

a) at least one compound of formula (I):

(I)

in which:
W represents a bond, $CR_4R_5$, $NR_4$, O or S;
X represents $CR_6R_7$, $NR_6$, O or S;
Y represents $CR_8R_9$, $NR_8$, O or S;
Z represents $CR_{10}R_{11}$, $NR_{10}$, O or S;
$R_1$ represents OH or SH; and
$R_2$, $R_3$, $R_4$, $R_5$, $R_6$, $R_7$, $R_8$, $R_9$, $R_{10}$, and $R_{11}$, which are identical or different, represent:
H;
OH, SH;
an amine group;
an alkyl, haloalkyl or heteroalkyl group containing between 1 and 30 carbon atoms in a linear or branched chain;

an alkenyl or alkynyl group containing between 2 to 30 carbon atoms in a linear or branched chain;

one or more cycloalkyl, cycloalkenyl or cycloalkynyl groups containing between 3 to 30 carbon atoms in a linear or branched chain;

one or more aryl or heteroaryl groups containing between 3 to 10 carbon atoms per ring;

an alkaryl or aralkyl group containing between 1 and 30 carbon atoms, the terms aryl and alkyl having the definitions above;

an alkoxy, thioalkyl, sulfonylalkyl or aminoalkyl group containing between 1 and 30 carbon atoms in a linear or branched chain;

an alkoxyalkyl, alkylthioalkyl, alkylsulfonylalkyl or alkylaminoalkyl group containing between 1 and 30 carbon atoms in a linear or branched chain;

one or more heterocyclic groups containing between 5 and 10 carbon atoms per ring;

said groups all being optionally substituted by $R_2$, by one or more nitro, cyano, hydroxyl, carboxyl, carbonyl or amino groups, by one or more halogens or by one or more nitrile, cyanohydrin or aldehyde functions;

the compound of formula (I) being other than chitosan, neomycin, neomycin B, kanamycin A, kanamycin B, neamine, and amikacin;

and b) at least one metal ion.

For the purposes of the present invention:

"amine" means a group containing a nitrogen atom. The amine may be a primary amine $NH_2$, secondary amines NHR' or tertiary amines NR'R". R' and R", which are identical or different, have the same definition as $R_2$;

"alkyl" means a linear or branched hydrocarbon radical of 1 to 30 carbon atoms, such as, by way of indication, methyl, ethyl, propyl, isopropyl, butyl, tert-butyl, isobutyl, pentyl, hexyl, heptyl, octyl, nonyl, decyl, undecyl, dodecyl, tridecyl, tetradecyl, pentadecyl, hexadecyl, heptadecyl, octadecyl, nonadecyl or icosyl. The alkyl group defined above may contain one or more halogen atoms (fluorene, chlorene, bromine or iodine). In that case it is referred to as a "haloalkyl" group. The alkyl group may also comprise heteroatoms selected from P, O, N, S and Se. In that case it is referred to as a "heteroalkyl" group;

"alkenyl" means a linear or branched hydrocarbon chain of 2 to 30 carbon atoms containing one or more double bonds. Examples of alkenyl groups are the alkenyl groups which carry just one double bond, such as —CH=CH—CH—$CH_2$, $H_2C$=CH-(vinyl) or $H_2C$=CH—$CH_2$-(allyl);

"alkynyl" means a linear or branched hydrocarbon of 2 to 30 carbon atoms, containing one or more triple bonds. Examples of alkynyl groups are the alkynyl groups which carry just one triple bond, such as —$CH_2$—C≡CH;

"cycloalkyl" means saturated hydrocarbon groups which may be monocyclic or polycyclic and which contain 3 to 10 carbon atoms. They are, for example, monocyclic cycloalkyl groups such as cyclopropyl, cyclobutyl, cyclopentyl, cyclohexyl, cycloheptyl, cyclooctyl, cyclononyl, cyclodecyl, cycloundecyl, and cyclododecyl;

"cycloalkenyl" means a group derived from a cycloalkyl group as defined above, having one or more double bonds, for example, two double bonds. The group in question is, for example, the cyclohexene (one double bond) or cyclopenta-1,3-diene (two double bonds) group;

"cycloalcynyl" means a group derived from a cycloalkyl group as defined above, having one or more triple bonds, for example, one triple bond;

"aryl" means a monocyclic or polycyclic aromatic hydrocarbon group containing 3 to 10 carbon atoms per ring, such as phenyl or naphthyl;

"heteroaryl" means a monocyclic or polycyclic aromatic group containing between 3 and 10 carbon atoms per ring and containing 1, 2 or 3 endocyclic heteroatoms per ring, selected from P, O, N, S and Se. Examples thereof are the groups furyl, thienyl, pyrrolyl, oxazolyl, isoxazolyl, thiazolyl, isothiazolyl, imidazolyl, pyrazolyl, oxadiazolyl, triazolyl, thiadiazolyl, pyridyl, pyridazinyl, pyrazinyl, and triazinyl;

"alkaryl" means an alkyl group substituted by an aryl group, these two groups being defined above;

"aralkyl" means an alkyl group substituted by an aryl group, these two groups being defined above;

"alkoxy" means an O-alkyl group having 1 to 30 carbon atoms, in particular methoxy, ethoxy, propoxy, and butoxy. "Alkoxyalkyl" means an alkyl-O-alkyl group having 1 to 30 carbon atoms. The groups "thioalkyl" or "alkylthioalkyl", "sulfonylalkyl" or "alkylsulfonylalkyl" and "aminoalkyl" or "alkylaminoalkyl" additionally contain, respectively, one or more sulfur atoms, one or more sulfonyl groups, and one or more amine functions;

"heterocyclic group" means saturated or unsaturated, monocyclic or polycyclic carbon rings having 1, 2 or 3 endocyclic heteroatoms selected from P, O, N, S and Se. They are, generally, derivatives of the heteroaryl groups described above. Examples of unsaturated heterocycles are dihydrofuryl, dihydrothienyl, dihydropyrrolyl, pyrrolinyl, oxazolinyl, thiazolinyl, imidazolinyl, pyrazolinyl, isoxazolinyl, isothiazolinyl, oxadiazolinyl, pyranyl, and the monounsaturated derivatives of piperidine, of dioxane, of piperazine, of trithiane, of morpholine, of dithiane, and of thiomorpholine, and also tetrahydropyridazinyl, tetrahydropyrimidinyl, and tetrahydrotriazinyl.

The groups defined above may, in accordance with the invention, be substituted by $R_2$, by one or more nitro, cyano, hydroxyl, carboxyl, carbonyl or amino groups, by one or more halogens or by one or more nitrile, cyanohydrin or aldehyde functions.

The compound of formula (I) has the characteristic of greatly complexing metal ions, for example, the ions of transition metals.

The metal ion is preferably divalent. The metal ions are, for example, selected from $Cu^{2+}$, $Ni^{2+}$, $Zn^{2+}$, $Cd^{2+}$, $Co^{2+}$; more preferably the ion is $Cu^{2+}$.

The metal ions may be present in a form associated with anions, preferably in the form of copper sulfate $CuSO_4$ or copper acetate $Cu(CH_3COO)_2$.

It is important to note that, according to the present invention, the five- or six-atom ring of the compound and its substituents according to formula (I), in other words the compound (I) in its entirety, is the reactive species, and not a substituent only of the compound according to formula (I). By "reactive species" is meant the arrangement of atoms which permits binding or specific adsorption to one of the optical isomers or enantiomers of a compound. For example, it is possible to imagine a compound of the prior art exhibiting, as a substituent, the compound of formula (I) above, or any of the compounds (II) to (XIX) described below. Such a compound is not a chiral selector in the sense of the present invention if it is not the compound (I) in its entirety, which is the reactive species. An example of a compound which does not enter into the field of the present invention is a barbituric acid substituted by an aminoside, the barbituric acid ring being the reactive species.

The chiral selector of the present invention is advantageous because it exhibits a greater separation spectrum than the other chiral selectors used in chiral ligand-exchange chromatography. In particular it allows the separation of enantiomers from nucleosides. Moreover, the compounds of the invention (formula (I) above and (II) to (XIX) below) may be functionalized with different positions, allowing in particular reversals in the order of elution and allowing modifications to the selectivity. A greater diversity is offered on the basis of the same unit.

According to one embodiment of the present invention, the chiral selector for separating the enantiomers of a compound comprises:

a) at least one compound of formula (II):

(II)

in which:

X represents $CR_4R_5$, O, S, $NR_4$, $CR_4R_5-CR_6R_7$, $CR_4R_5-NR_6$, $O-CR_4R_5$, $S-CR_4R_5$, $O-NR_4$, $NR_4-NR_6$ or $S-S$; and Y, Z, $R_1$, $R_2$, $R_3$, $R_4$, $R_5$, $R_6$, $R_7$, $R_8$, $R_9$, $R_{10}$, and $R_{11}$, which are identical or different, are as defined above;

the compound of formula (II) being other than chitosan, neomycin, neomycin B, kanamycin A, kanamycin B, neamine, and amikacin;

and b) at least one metal ion.

According to another embodiment of the present invention, the chiral selector for separating the enantiomers of the compound comprises:

a) at least one compound of formula (III):

(III)

in which Y, $R_1$, $R_2$, $R_3$, $R_4$, $R_5$, $R_6$, $R_7$, $R_8$, $R_9$, $R_{10}$, and $R_{11}$, which are identical or different, are as defined above;

the compound of formula (III) being other than chitosan, neomycin, neomycin B, kanamycin A, kanamycin B, neamine, and amikacin;

and b) at least one metal ion.

According to another embodiment of the present invention, the chiral selector for separating the enantiomers of a compound comprises:

a) at least one compound of formula (IV) or of formula (V):

(IV)

(V)

in which $R_1$, $R_2$, $R_3$, $R_4$, $R_5$, $R_6$, $R_7$, $R_8$, $R_9$, $R_{10}$, and $R_{11}$, which are identical or different, are as defined above;

the compounds of formula (IV) and (V) being other than chitosan, neomycin, neomycin B, kanamycin A, kanamycin B, neamine, and amikacin;

and b) at least one metal ion.

According to another embodiment of the present invention, the chiral selector for separating the enantiomers of a compound comprises:

a) at least one compound of formula (VI) or a compound of formula (VII):

(VI)

(VII)

in which $R_4$, $R_5$, $R_6$, $R_7$, $R_8$, $R_9$, $R_{10}$, and $R_{11}$, which are identical or different, are as defined above;

the compounds of formula (VI) and (VII) being other than chitosan, neomycin, neomycin B, kanamycin A, kanamycin B, neamine, and amikacin;

and b) at least one metal ion.

The compounds of formula (VI) and (VII) are aminoglycoside derivatives. In particular they are selected from aminoglycosides of natural origin, synthetic or semisynthetic aminoglycosides, and aminoglycosides obtained by cleavage from natural aminoglycosides.

An aminoglycoside is a cyclic compound comprising an amine function, an endocyclic oxygen, and at least one hydroxyl function. Aminoglycosides, which are also called aminosides, are known and described in the prior art (see, for example, US 2003/0109461 or US 2005/0171035). They constitute a class of antibiotics which are active on certain types of bacteria.

According to the present invention, compounds (I) to (XIX) are used not as antibiotics or pharmaceutical agents but as chiral selectors, for purposes of preparative or analytical chiral separation.

Preferably the compounds of formula (I) are selected from:

glucosamine (VIII)

if R = OH, (IX) = streptamine
if R = H, (IX) = 2-deoxystreptamine (IX)

aminoglucopyranoside (X)

paromamine (XI)

methyl neobiosamine (XII)

paromomycin (XIII)

lividomycin (XIV)

tobramycin (XV)

streptomycin (XVI)

According to the present invention the compound of formula (I) of the present invention may contain a group allowing it to be immobilized on a support. Alternatively it is possible to functionalize the compound of formula (I) if it contains no such group and if the presence of that group is necessary for the purpose of separating the enantiomers.

For example, it is entirely possible, according to the present invention, to contemplate functionalizing the abovementioned compounds of formula (VIII) to (XVII) for the purpose of immobilizing them on a support. The methods of functionalizing the compounds are described in the literature.

Indicatively, the groups which allow immobilization on a support may be a hydrocarbon chain, an aromatic group or a polar group. Such groups may be selected for non-covalent fixing on chromatographic supports of various polarity (for example, stationary phases of C1, C4, C8, C18, phenyl, porous graphite carbon, cyano, silica or diol type). The choice of the group is guided by the type of chromatographic support used.

For example, the compound of formula (I) will be functionalized with an aromatic substituent for a stationary phase composed of porous graphite carbon.

In another example, the compound of formula (I) will be functionalized with one or more lipophilic chains for the separation of enantiomers by ligand exchange in micellar electrokinetic chromatography.

Equally, said compound of formula (I) may be biotinylated for its immobilization on the solid support, while the solid support may be functionalized with streptavidin.

Alternatively it is possible to contemplate functionalizing said compound with a spacer arm, for example, an alkyl or phenyl chain, and to use a solid support which allows immobilization via a hydrophobic effect (apolar stationary phase).

According to one preferred embodiment, the compound of formula (I) of the present invention is a neamine derivative substituted in position 5, 6, 3' and/or 4' by a substituent R''' which corresponds to the definition of $R_2$ as given above. Indicatively, this may be a neamine alkylated in position 5, 6, 3' and/or 4', selected from:

(XVII)

(XIX)

(XVIII)

(XVII): neamine alkylated in position 5
(XVIII): neamine alkylated in position 6
(XIX): neamine alkylated in position 4'

A neamine derivative can be prepared by the following process, starting from a neamine compound of the formula (XX):

neamine

This process for preparing a neamine alkylated in position 5, 6, 3' and/or 4' comprises a step of protecting the amine functions of the neamine with trityl, monomethoxytrityl or dimethoxytrityl groups in the presence of a base whose pKa is greater than that of the amine functions of the neamine, according to the process described in patent application WO 2005/060573. That process further comprises a step of protecting the hydroxyl functions which are not to be alkylated. The hydroxyl functions are protected, for example, using p-methoxybenzyl groups. The hydroxyl function to be aklyated may subsequently be alkylated selectively by reaction, for example, with 1-bromooctadecane, in the presence of a base which is capable of deprotonating the hydroxyl function. Subsequently, deprotection of the amine and hydroxyl functions by treatment, for example, with a TFA/anisole mixture gives the desired derivative.

Indicatively, to obtain compound (XVII) above, the 3', 4' and 6 hydroxyl functions are protected. The 5 hydroxyl function is then selectively alkylated. Subsequently the amine and hydroxyl functions are deprotected by treatment, giving the desired derivative (XVII). The compound (XIX) may be obtained similarly by selective alkylation of the tritylated derivative, protected on the hydroxyl functions at 3' and 6 by p-methoxybenzyl groups. Deprotection in the presence of TFA/anisole then gives the derivative (XIX).

The process for preparing the 6-alkylated derivative (compound XVIII above) has the advantage of being simpler. This is because the alkyl chain is introduced directly without intermediate protection of the hydroxyl functions, for example by p-methoxybenzyl groups. The derivative tritylated on the four amine functions is alkylated directly, for example, with 1-bromooctadecane, in the presence of a base which is capable of deprotonating the hydroxyl functions. The reaction takes place primarily in position 6. Deprotection is carried out, for example, in the TFA/anisole mixture.

The processes described are useful for introducing at position 4', 5 or 6 a chain which carries a terminal function (carboxylic acid, amine, etc. function) which allows the corresponding neamine derivatives to be immobilized covalently on a solid support. The processes also allow introduction of different functionalities and specificities of recognition on the neamine nucleus for the purpose of enhancing or increasing the selectivity of the chiral separation.

Another aspect of the present invention relates to the chiral phases prepared from the chiral selectors described above.

Generally speaking, in view of the structure of the chiral selector according to the invention, the separation is based on ligand exchange. There are various methods of chiral separation in existence. It is possible to divide these methods into two categories: chiral stationary phases and chiral mobile phases (also called chiral migration buffers). The chiral stationary phases are composed of a solid support on which the chiral selector is fixed, while the chiral mobile phases (or chiral migration buffers) are composed of a liquid medium or migration liquid containing the chiral selector. One of the common methods involves passing a solution containing a mixture of the enantiomers of a compound over a chiral stationary phase or into a chiral mobile phase in order to obtain the greatest retention of one of the enantiomers. Careful elution then allows the enantiomers of the compound to be recovered separately.

More specifically it is possible to select from:
chromatographic techniques of chiral separation, especially high-performance liquid chromatography (HPLC), supercritical-fluid or gas chromatography (SFC or GC), and thin-layer chromatography (TLC);
electrophoretic techniques of chiral separation, especially micellar electrokinetic chromatography (MEKC), capillary zone electrophoresis (CZE), and electrochromatography (ECC).

The present invention relates to analytical chiral separation but also to preparative chiral separation.

The chiral phases of the present invention allow the preparation of enantiomers of certain types of compounds. These compounds must contain electron donor groups. Mention may be made in particular of the separation of the enantiomers of amino acids (one —COOH function and one —$NH_2$ function), acid alcohols (one —COOH function and one —OH function), peptides (—CO—NH—), dipeptides, tripeptides, etc., amino alcohol (one —OH function and one —$NH_2$ function), nucleosides (nucleotide and ribose) and oligopeptides. Preference is given to the separation of the enantiomers of amino acids, nucleosides, and oligopeptides.

The supports of the chiral stationary phases, the migration liquids of the chiral mobile phases, and the conditions under which they are used (pH, temperature, concentration, etc.) are known to the skilled person and are described in the literature (J. Chromatogr. A 2001, 906, 1-489; Chiral Analysis, Ed: K. and M. Bush, Elsevier, October 2006, chapter II).

The invention further provides a chiral stationary phase for the separation of the enantiomers or the optical isomers of a compound, said stationary phase comprising an inert solid support on which a chiral selector is fixed, said chiral selector being a mixture of the compound of formula (I) defined above and a metal ion. Fixing between the compound of formula (I) above and the solid support may be covalent or noncovalent.

The inert solid supports include, for example, particles of agarose, particles of silica, particles of polystyrene-divinylbenzene and monolithic phases. The support may be, for example, particles of silica grafted with alkyl chains containing 18 carbon atoms (octadecyl). It is also possible to employ C8 (octyl) or C4 (butyl) phases if the C18 phase is too hydrophobic. The support may also be of porous graphite carbon type, or more polar supports of diol or cyano type. Supports of the same type may be employed for the other chromatographic techniques (CCM, supercritical chromatography, etc.).

The racemic mixture is entrained by a liquid which is called the mobile phase. Examples of mobile phases include the aqueous-organic (water/methanol) mixture containing a predetermined concentration of $Cu^{2+}$ (for example, 0.5 mM).

The enantiomers of the racemic mixture will interact with the chiral stationary phase. The enantiomers are separated by the reversible formation of complexes between the chiral selector and the enantiomers of the compound. These complexes possess different physical properties, which allow the physical separation of the enantiomers. There is a distribution of the enantiomers between the two types of phase: the mobile phase and the chiral stationary phase. One of the enantiomers forms a complex with the chiral selector, while the other enantiomer is entrained in the mobile phase. This allows them to be separated.

The chiral selector must therefore exhibit a greater affinity for one of the enantiomers to be separated.

The methods of noncovalent immobilization (by hydrophobic effect, by hydrogen bonds, by van der Waals interactions) of the compounds of formula (I) defined above on the inert solid support are selected according to the type of substituents used (for example: aromatic substituent/porous graphite carbon stationary phase; lipophilic chain substituent/C18 stationary phase; polar substituent/cyano stationary phase, etc.).

As mentioned above, if necessary, it is possible to functionalize a compound according to any one of formulae (I) to (XIX), for example, a neamine or a glucosamine, for the purpose of immobilizing it on the solid support.

The invention also relates to a process for preparing a chiral stationary phase for the separation of enantiomers of a compound or of a molecule, which comprises the following steps:
a) taking a compound of formula (I) defined above, which is optically active and has an affinity for one of the enantiomers to be separated, and
b) fixing the compound selected in step a) to a solid support, to give a chiral stationary phase.

Fixing between the compound selected in step a) and the support may be covalent or noncovalent.

The invention further provides a chiral mobile phase for the separation of enantiomers, comprising a liquid migration buffer and a chiral selector in solution in said buffer, said chiral selector being a compound of formula (I) defined above, which is optically active and has an affinity for one of the enantiomers to be separated.

Migration buffers include, for example, TRIS, borate, phosphate or acetate buffers.

According to one embodiment of the present invention, the pH of the migration buffer varies between 3 and 8, for example between 4 and 7, or even between 5 and 6.

With regard to the concentration, in the context of a micellar electrokinetic chromatography (MEKC), it is preferred to use a compound substituted by lipophilic groups (C18, for example) at a concentration greater than the critical micelle concentration. In the context of a capillary electrophoresis (CEC) it is preferred to use a compound which is unsubstituted or substituted by hydrophilic groups at a concentration of from 1 to 20 mM.

According to one embodiment of the present invention, micellar electrokinetic chromatography is used (capillary electrophoresis apparatus). In this case, compounds of formula (I) are used which contain a lipophilic chain, or these compounds are functionalized with such groups, in order to separate the enantiomers. A coated capillary (PVA type), which allows the silanol groups on the inner surface of the capillary to be masked, may be used, for example. The compounds of formula (I) are added to the migration buffer at a concentration greater than the critical micelle concentration, in the presence of metal ion, $Cu^{2+}$ for example. The separation of the enantiomers is based on the differences in the migration rates of the solutes, which depend on their interaction with the pseudo-stationary micellar phase (formation of the diastereoisomeric complex).

Another aspect of the present invention relates to a method of separating the enantiomers of a compound, comprising:
a) preparing a stationary or mobile chiral phase,
b) contacting the enantiomers to be separated with said chiral phase, and
c) collecting at least one enantiomer of said compound.

Step a), which involves preparing the chiral phase, may itself comprise a plurality of steps.

In the case of a chiral stationary phase, it may be necessary to carry out the immobilization of the compound of formula (I) defined above on the solid support. Immobilization involves forming a covalent or noncovalent bond between the compound of formula (I) and the solid support. This must be done without denaturing the compound of formula (I), since said compound must retain its affinity for the enantiomer.

Step b) corresponds to the formation of a ternary complex between the compound of formula (I), the metal ion, and one of the enantiomers of a compound—for example, of an amino acid or of a nucleoside.

The mixture of the enantiomers of the compound may in particular be obtained from a reaction mixture or may be present in a purified form.

In one particular embodiment of step b) a solution containing the mixture of enantiomers is contacted with the chiral stationary phase in a chromatographic system. This step corresponds to the adsorption of one of the two enantiomers and the simultaneous elimination of the other enantiomer. One of the enantiomers is specifically recognized by the chiral selector, and this is manifested by a longer retention time for this enantiomer in relation to the other enantiomer of this same compound. This difference in retention time allows the separate collection of at least one of the enantiomers at the end of the chromatographic column or at the end of the electrophoresis capillary.

In another embodiment of step b) the chiral selector is added to the migration buffer in, for example, a capillary electrophoresis system. A solution containing the mixture of enantiomers is injected into the capillary in the migration buffer. As before, one of the enantiomers is specifically recognized by the chiral selector, and this is manifested by a longer migration time in the capillary for this enantiomer in relation to the other enantiomer of this same compound. This difference in retention time allows the separate collection of at least one of the enantiomers at the end of the capillary.

The supports of the chiral stationary phases, the migration liquids of the chiral mobile phases, and the conditions under which they are used (pH, temperature, concentration, etc.) are known to the skilled person and are described in the literature (J. Chromatogr. A 2001, 906, 1-489; Chiral Analysis, Ed: K. and M. Bush, Elsevier, October 2006, chapter II).

According to one embodiment, the method of separating the enantiomers of a compound takes place at a temperature between 8 and 35° C., for example, between 18 and 35° C., preferably 24-28° C.

Another aspect of the present invention relates to a method of assaying the amount of an enantiomer of a compound in a mixture comprising the enantiomers of that compound, said method comprising:

a) contacting the enantiomers to be separated with a stationary or mobile chiral phase, as stated above, b) collecting at least one enantiomer of said compound, and c) assaying the enantiomer of said compound.

Finally, a last aspect of the present invention also relates to the use of the chiral selector defined above in chromatographic techniques of chiral separation, electrophoretic techniques of chiral separation, and electrochromatographic techniques of chiral separation.

The examples and figures below will demonstrate certain advantages and characteristics of the present invention.

FIGURES

Chiral stationary phase (CSP): 1×150 mm, 3 µm; Flow rate: 40 µl·min$^{-1}$; T: 24° C.; 250 nL injected; D-L proline 0.625 mM (for each of the enantiomers); mobile phase: 98-2% ($H_2O$-MeOH)+$CuSO_4$; $\lambda$=236 nm.

CSP: 1×150 mm, 3 µm; Flow rate: 40 µl·min$^{-1}$; T: 24° C.; 250 nL injected; D-L proline 0.625 mM (for each of the enantiomers); mobile phase: 98-2% ($H_2O$-MeOH)+$CuSO_4$; $\lambda$=236 nm.

CSP: 1×150 mm, 3 µm; Flow rate: 40 µl·min$^{-1}$; T: 24° C.; 250 nL injected; D-L proline 0.625 mM (for each of the enantiomers); mobile phase: 98-2% ($H_2O$-MeOH)+$CuSO_4$; $\lambda$=236 nm.

CSP: 1×150 mm, 3 µm; Flow rate: 40 µl·min$^{-1}$; 250 nL injected; D-L proline 0.625 mM (for each of the enantiomers); mobile phase: 98-2% ($H_2O$-MeOH)+$CuSO_4$ (0.5 mM); $\lambda$=236 nm.

CSP: 1×150 mm, 3 µm; mobile phase: 98-2% ($H_2O$-MeOH)+$CuSO_4$ (0.5 mM); T 20° C.; Flow rate: 40 µl·min-1; 250 nL injected; D-L proline 0.625 mM (for each of the enantiomers), $\lambda$=236 nm.

EXAMPLES

1. Apparatus and Methods 1.1. Apparatus

The studies were carried out on two micro-HPLC stations consisting of a SHIMADZU SIL 10 AT pump (Sarreguemines, France), a SHIMADZU SIL 10 AD injection system in one case (5-mono C18 neamine) or a CHEMINERT TM CN2-4346 injection valve with a 250 nL injection loop, and a SHIMADZU SPD-10A UV-visible detector ($\lambda$=192 nm for the immobilization of the neamine; $\lambda$=220 and 236 nm for the solutes injected). A number of reversed-phase polarity columns of type RP-C18 (Inertsil-ODS-3), available from Dionex (Amsterdam, the Netherlands), were used, at a temperature controlled by an IGLOOCIL oven (Interchim).

1.2. Reagents

All of the racemates and enantiomers are obtained from Sigma-Aldrich (Saint-Quentin, France), Bachem (Weil am Rhein, Germany) or ChemGenes Corporation (Wilmington, USA).

The copper sulfate is supplied by Prolabo (Rhône-Poulenc, France).

The HPLC-grade methanol is purchased from Fisher Scientific (Leicestershire, UK).

The water is obtained from an Elgastat option water purification system (Odil, Talant, France) equipped with a reverse osmosis cartridge.

The 4'-mono C18 neamine, 5-mono C18 neamine, and 6-mono C18 neamine are prepared as indicated below.

1.3. Preparation of the 4'-mono C18 neamine, 5-mono C18 neamine, and 6-mono C18 neamine Derivatives The 4'-mono C18 neamine (compound XIX) and the 5-mono C18 neamine (compound XVII) are prepared according to the process described in patent application WO 2005/060573. The 6-mono C18 neamine (compound XVIII) is prepared without protection of the hydroxyl functions, directly from the tetratritylated neamine not protected on the hydroxyl functions.

This process comprises:
the protection of the four amine functions in positions 1, 3, 2' and 5' of the neamine by trityl groups, to give the tetratritylated derivative, and
the protection, by p-methoxybenzyl groups, of the following hydroxyl functions:
in positions 6 and 3' for the 4'-mono C18 neamine,
in positions 6, 3', and 4' for the 5-mono C18 neamine, or The step of protecting the amine functions of the neamine by means of trityl groups is performed in the presence of a base whose pKa is greater than that of the amine functions of the neamine. Examples of bases meeting this criterion are given in patent application WO 2005/060573.

The step of protecting the hydroxyl functions of the neamine by means of methoxybenzyl groups is performed in the presence of a base which is capable of deprotonating the hydroxyl function. Examples of bases meeting this criterion are given in patent application WO 2005/060573.

The deprotection of the amine and hydroxyl functions takes place in an acidic medium, for example, in the TFA/anisole mixture.

1.3.1. Synthesis of the 5-$C_{18}$-neamine Derivative (Compound XVII)

The neamine protected on these amine functions in positions 1, 3, 2', and 5' and hydroxyl functions in positions 6, 3', and 4' (1.0 g; 0.60 mmol) is dissolved in 60 mL of anhydrous DMF at ambient temperature under argon, and then sodium hydride in suspension in oil (NaH 60%, 250 mg; 6.25 mmol) is added. After 30 min, 1-bromo-octadecane (1.0 g; 3.0 mmol) is added to the reaction mixture, which is stirred at 70° C. for 24 h before being concentrated under reduced pressure. The residue is dissolved in dichloromethane and the organic solution is washed with saturated ammonium chloride solution, with water, and then with saturated NaCl solution. The organic phase is dried over magnesium sulfate, filtered, and then evaporated to dryness. The crude product is then purified on an alumina column with a $CH_2Cl_2$/cyclohexane mixture (20/80) as eluent, to give the protected neamine alkylated in position 5, with a yield of 68%. The protective groups are subsequently eliminated by treatment with a trifluoroacetic acid/anisole mixture in accordance with the procedure described in the article by E. Riguet et al., Tetrahedron, 2004, to give the expected 5-$C_{18}$-neamine (compound XVII) with a 64% yield.

$^1$H NMR (400 MHz, $D_2O$): δ=5.70 (d, J=3.6 Hz, 1H, H1'), 3.77-3.96 (m, 4H, H3', H4, H5', H6), 3.52-3.68 (m, 3H, H5, $CH_2O$ chain), 3.37-4.48 (m, 2H, H3, H4'), 3.30 (t, J=9 Hz, 1H, H6' b), 3.19-3.27 (m, 2H, H1, H2'), 3.04 (dd, J=8.4 and 13.2 Hz, 1H, H6' a), 2.35 (dd, J=4.0 and 12.4 Hz, 1H, H2$_{eq}$), 1.76 (dd, J=12.4 Hz, 1H, H2$_{ax}$), 1.43 (s, 2H, $CH_2$ chain) 1.05-1.25 (m, 30H, $CH_2$ chain), 0.76 (t, J=6.8 Hz, 3H, $CH_3$); $^{13}$C NMR (100 MHz, $D_2O$): δ=92.9 ($C_{1'}$), 82.4 ($C_5$), 73.5 ($C_4$), 72.9 ($C_6$), 72.2 ($CH_2O$ chain), 70.7 ($C_{4'}$), 70.0 ($C_{5'}$), 68.7 ($C_{3'}$), 53.5 ($C_{2'}$), 49.9 ($C_1$), 48.9 ($C_3$), 40.5 ($C_{6'}$), 31.8, 29.7, 29.5, 29.4, 29.3 and 29.2 ($CH_2$ chain), 27.9 ($C_2$), 25.3 and 22.5 ($CH_2$ chain), 13.7 ($CH_3$ chain); MS (FAB): m/z=575 [M+H]$^+$, 415, 397, 161; HRMS (ESI): [M+H]$^+$ m/z theoretical=575.4548, found=575.4751, [M+Na]$^+$ m/z theoretical=597.4567, found=597.4546.

1.3.2. Synthesis of the 4'-$C_{18}$-neamine Derivative (Compound XIX)

The neamine protected on these amine functions in positions 1, 3, 2', and 5' and hydroxyl functions in positions 6 and 3' (1.0 g; 0.65 mmol) is dissolved in 60 mL of anhydrous DMF at ambient temperature under argon, and then sodium hydride in suspension in oil (NaH 60%, 520 mg; 13 mmol) is added. After 30 min, 1-bromo-octadecane (325 mg; 0.95 mmol) is added to the reaction mixture, which is stirred at 70° C. for 24 h before being concentrated under reduced pressure. The residue is dissolved in dichloromethane and the organic solution is washed with saturated ammonium chloride solution, with water, and then with saturated NaCl solution. The organic phase is dried over magnesium sulfate, filtered, and then evaporated to dryness. The crude product is then purified on an alumina column with a $CH_2Cl_2$/cyclohexane mixture (30/70) as eluent, to give the protected neamine alkylated in position 4', with a yield of 40%. The protective groups are subsequently eliminated by treatment with a trifluoroacetic acid/anisole mixture in accordance with the procedure described in the article by E. Riguet et al., Tetrahedron, 2004, to give the expected 4'-$C_{18}$-neamine (compound XIX) with a 60% yield.

$^1$H NMR (400 MHz, $D_2O$): δ=5.98 (d, J=3.6 Hz, 1H, H1'), 4.00-4.16 (m, 3H, H3', H4, H5', H6), 3.83 (m, 1H, $CH_2O$ chain), 3.73 (t, J=9.2 Hz, 1H, H5), 3.50-3.65 (m, 4H, H3, H2', H6, 1H $CH_2O$ chain), 3.26-3.46 (m, 3H, H1, H4', H6' b), 3.20 (m, 1H, H6' a), 2.51 (m, 1H, H2$_{eq}$), 1.94 (dd, J=12.4 Hz, 1H, H2$_{ax}$), 1.53 (s, 2H, $CH_2$ chain) 1.05-1.35 (m, 30H, $CH_2$ chain), 0.78 (t, J=6.4 Hz, 3H, $CH_3$); $^{13}$C NMR (100 MHz, $D_2O$): δ=95.2 ($C_{1'}$), 79.5 ($C_{4'}$), 77.1 ($C_4$), 75.2 ($C_5$), 74.3 ($CH_2O$ chain), 72.5 ($C_{6'}$), 70.0 ($C_{5'}$), 68.6 and 68.5 ($C_{5'}$ and $C_{3'}$), 53.8 ($C_{2'}$), 49.8 ($C_1$), 48.7 ($C_3$), 40.6 ($C_{6'}$), 32.0, 29.9, 29.8 and 29.5 ($CH_2$ chain), 28.2 ($C_2$), 25.7 and 22.7 ($CH_2$ chain), 13.9 ($CH_3$ chain); MS (FAB): m/z=615 [M+K]$^+$, 575 [M+H]$^+$, 413, 395, 366, 324, 203, 163; HRMS (ESI): [M+H]$^+$ m/z theoretical=575.4548, found=575.4748.

1.3.3. Synthesis of the 6-$C_{18}$-neamine Derivative (Compound XVIII)

The neamine tetratritylated in positions 1, 3, 2', and 5' (1.5 g; 1.16 mmol) is dissolved in a DMF/THF mixture (8 mL/8 mL) at ambient temperature under argon and then sodium hydride in suspension in oil (NaH 60%, 439 mg; 11 mmol) is added. After 30 min, 1-bromo-octadecane (850 mg; 2.55 mmol) is added to the reaction mixture, which is stirred at ambient temperature for 4 h before being concentrated under reduced pressure. The residue is dissolved in dichloromethane and the organic solution is washed with saturated ammonium chloride solution, with water, and then with saturated NaCl solution. The organic phase is dried over magnesium sulfate, filtered, and then evaporated to dryness. The crude product is then purified on an alumina column with a $CH_2Cl_2$/MeOH mixture (99.5/0.5) as eluent, to give the protected neamine alkylated in position 6, with a yield of 21%. The protective groups are subsequently eliminated by treatment with a trifluoroacetic acid/anisole mixture in accordance with the procedure described in the article by E. Riguet et al., Tetrahedron, 2004, to give the expected 4'-$C_{18}$-neamine (compound XVIII) with a 56% yield.

$^1$H NMR (400 MHz, $D_2O$): δ=5.83 (d, J=3.2 Hz, 1H, H1'), 3.80-3.93 (m, 3H, H3', H4, H5'), 3.78 (m, J=7.6 Hz, 1H, $CH_2O$ chain), 3.67 (t, J=9.2 Hz, 1H, H5), 3.52 (m, J=7.6 Hz, 1H, $CH_2O$ chain), 3.29-3.41 (m, 5H, H3, H2', H6, H4', H6' b), 3.10-3.24 (m, 2H, H1, H6' a), 2.37 (m, 1H, H2$_{eq}$), 1.82 (dd, J=12.4 Hz, 1H, H2$_{ax}$), 1.48 (s, 2H, $CH_2$ chain) 1.05-1.25 (m, 30H, $CH_2$ chain), 0.75 (t, J=6.8 Hz, 3H, $CH_3$); $^{13}$C NMR (100 MHz, $D_2O$): δ=95.9 ($C_{1'}$), 80.5 ($C_6$), 77.8 ($C_4$), 75.7 ($C_5$), 74.2 ($CH_2O$ chain), 70.8 ($C_{4'}$), 69.2 ($C_{5'}$), 68.3 ($C_{3'}$), 53.5 ($C_{2'}$), 49.0 ($C_1$), 48.4 ($C_3$), 40.2 ($C_{6'}$), 31.8, 29.6, 29.5 and 29.3 ($CH_2$ chain), 28.3 ($C_2$), 25.3 and 22.5 ($CH_2$ chain), 13.7 ($CH_3$ chain); MS (FAB): m/z=615 $[M+K]^+$, 575 $[M+H]^+$, 415, 397, 161; HRMS (ESI): $[M+H]^+$ m/z theoretical=575.4548, found=575.4749.

1.4. Preparation of the Stationary Phase

The three 5, 6, and 4' isomers of neamine, carrying a chain containing 18 carbon atoms, are taken up in a water/methanol mixture (98/2%). Their final respective concentrations are $7.5 \times 10^{-3}$ mol·l$^{-1}$ and $11.8 \times 10^{-3}$ mol·l$^{-1}$. They were then immobilized on microbore columns (300 mm id×15 cm) for C18 reversed phase chromatography by frontal analysis.

Two procedures are used for immobilizing the neamine derivatives on the C18 stationary phase:

a) 90 µl of 4'-mono C18 neamine are injected at a flow rate of 3 µl·min$^{-1}$ at ambient temperature. The operation is repeated three times. This gives 3.18 µmol of neamine for a column of 10 µl.

b) 170 µl of 5-mono C18 neamine are injected at a flow rate of 1 µl·min$^{-1}$ at ambient temperature. The operation is repeated three times. This gives 1.17 µmol of neamine for a column of 10 µl.

The neamine derivatives are not fixed irreversibly (noncovalent binding, hydrophobic effect).

The mobile phase used in both cases is composed of a water/methanol mixture (98/2%, v-v).

1.5. Evaluation of the Amount of Neamine Immobilized

Copper possesses the property of complexing neamine.

530 µl of a 5 mM solution of copper sulfate is injected at 1 µl·min$^{-1}$. The mobile phase used is composed of water. The analysis is recorded at 217 and 220 nm. The amount of copper bound and hence of active neamine is calculated from the first derivative of the plateau obtained by frontal analysis. The amount of neamine immobilized by this method is of the order of 0.3 µmol for a column of 10 µl.

2. Chiral Ligand Exchange Chromatography

2.1. Chromatographic Conditions

The mobile phase is composed of a methanol/water mixture (2/98%) with $CuSO_4$ added at different concentrations. The flow rate varies from 1 to 8 µl·min$^{-1}$ depending on the molecules to be separated.

The samples of the enantiomers are prepared in water or in a methanol/water mixture at different concentrations depending on the solutes.

250 nL or 100 nL are injected in triplicate at different temperatures, and the retention times are measured.

The apparent retention factor k is calculated using the following formula:

$$k = (t_R - t_0)/t_0,$$

in which:
$t_R$ is the retention time of each enantiomer and
$t_0$ is the retention time of a solute which is not retained (thiourea).

The retention time and the dead time of the column are corrected by the extra column dead time.

The enantioselectivity α is calculated according to the following formula:

$$\alpha = k_2/k_1,$$

in which:
$k_2$ is the retention factor of the more-retained enantiomer and
$k_1$ is the retention factor of the less-retained enantiomer.

The resolution Rs is calculated according to the following formula:

$$Rs = 2[(tr_2 - tr_1)/(w_2 + w_1)]$$

in which:
$t_{R2}$ is the retention time of the more-retained enantiomer
$t_{R1}$ is the retention time of the less-retained enantiomer
$w_2$ is the width of the peak at the base of the more-retained enantiomer
$w_1$ is the width of the peak at the base of the less-retained enantiomer

2.2. Determination of the Operating Conditions

In order to identify the optimum operating conditions for use, the effect of different chromatographic conditions on the retention and enantioselectivity of the neamine modified in position 4' was studied on a test amino acid, proline.

2.2.1. Effect of the Copper Concentration

In a first stage, the influence of the concentration of copper was studied at 24° C., to understand the influence of the copper on the retention and to modulate the interaction between the analyte and the stationary phase, so as to optimize the enantiomeric separation. The analyses were carried out with a mobile phase composed of a methanol/$H_2O$ mixture (2/98%) and a concentration of $CuSO_4$ varying from 0.1 to 10 mM.

Figure 1:
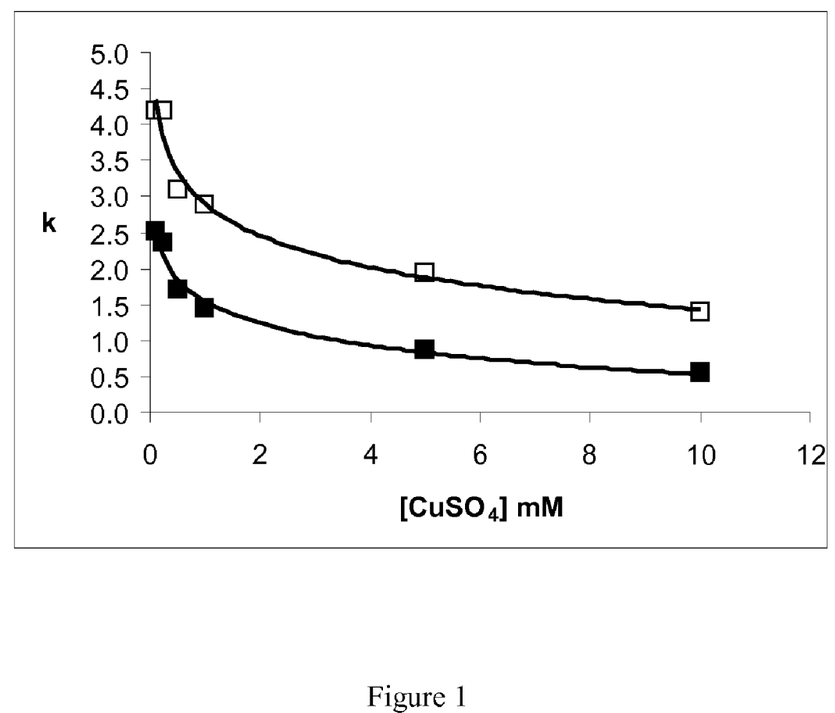
FIG. 1: Variation in retention factor k as a function of copper concentration in the mobile phase.

The change in apparent retention factor k for D-proline (white squares) and L-proline (black squares) is shown in FIG. 1.

Figure 2:
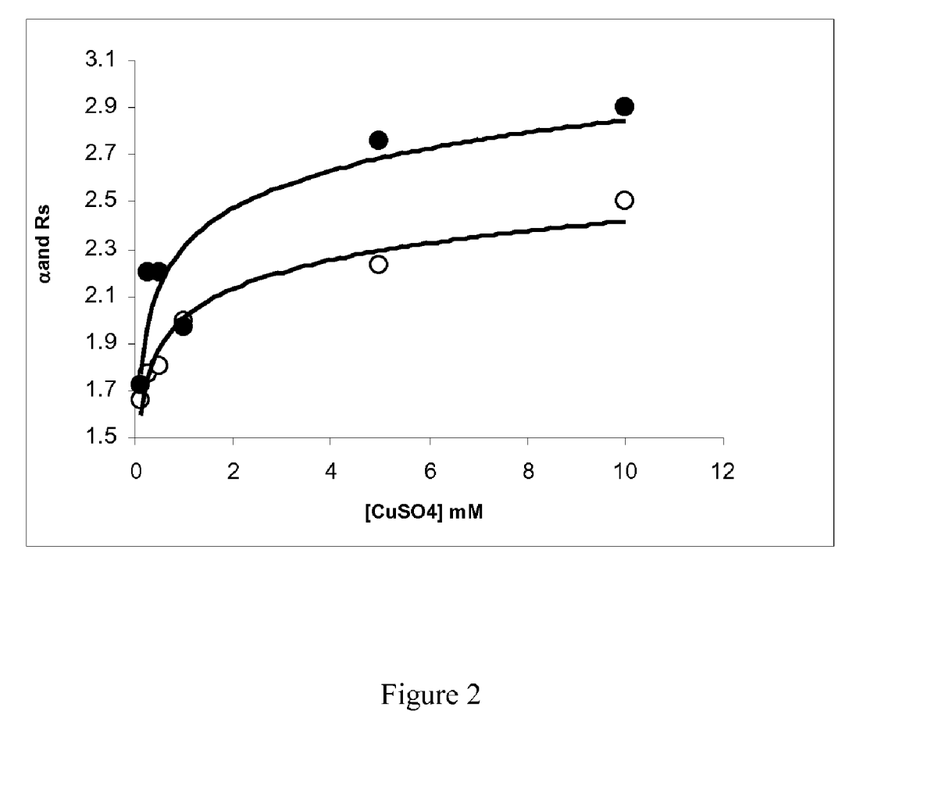
FIG. 2: Variation in enantioselectivity and in resolution as a function of concentration of copper in the mobile phase.

The change in resolution Rs (black circles) and in the selectivity α (white circles) is shown in FIG. 2.

The addition of an increasing concentration of copper to the mobile phase significantly reduces the apparent retention factors of the enantiomer in series L (an apparent retention factor k=2.51 becomes an apparent retention factor k=0.55), the same as for those of the enantiomer in series D (an apparent retention factor k=4.18 becomes an apparent retention factor k=1.38).

In contrast, the resolution Rs and the selectivity α increase with the concentration of $CuSO_4$ (FIG. 2).

Indicatively, at [CuSO4]=5 mM, Rs=2.75 and α=2.23
Indicatively, at [CuSO4]=10 mM, Rs=2.90 and α=$k_2/k_1$=1.38/0.55=2.51

The optimum conditions in terms of analysis time and resolution are obtained for a $Cu^{2+}$ concentration of between 5 and 15 mM, preferably between 7 and 13 mM, in particular for a $Cu^{2+}$ concentration at 10 mM.

Figure 3:
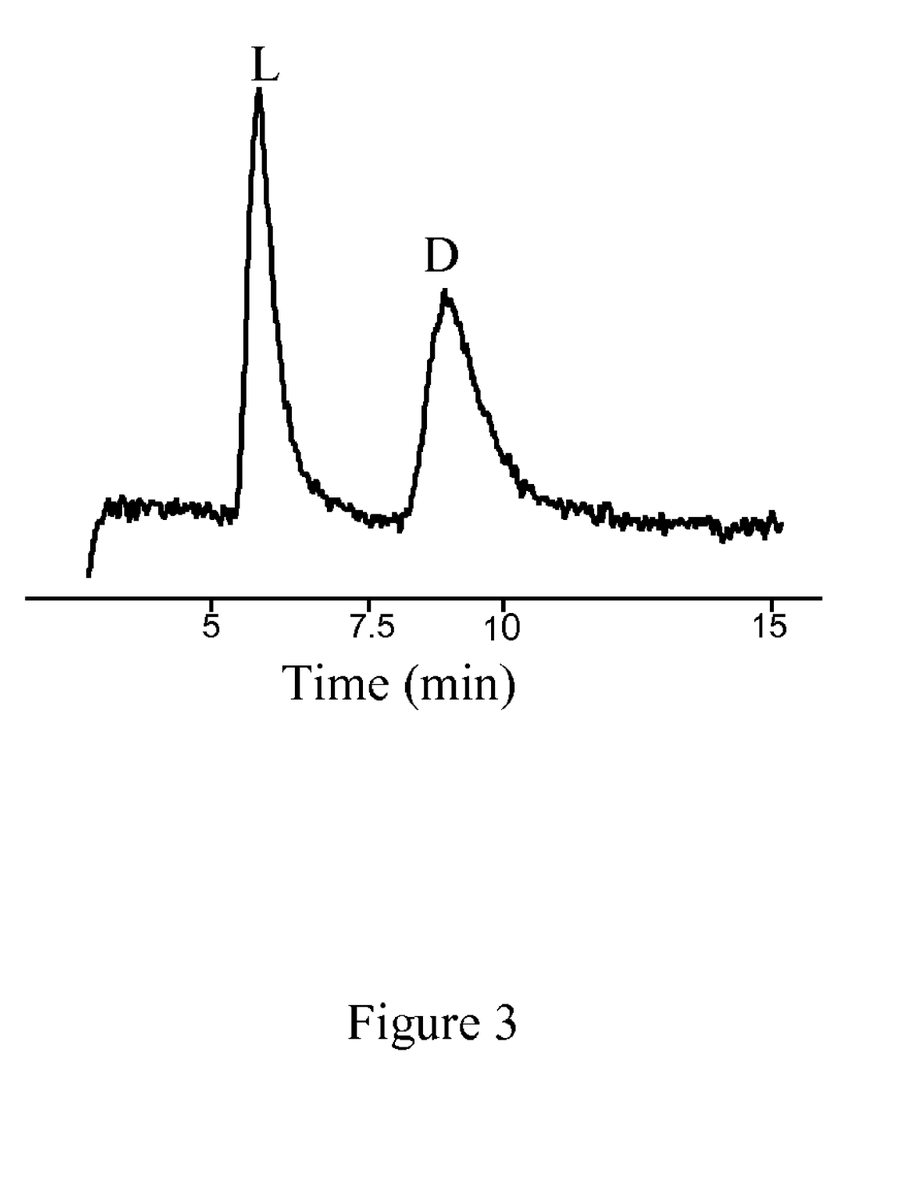
FIG. 3: Separation of the enantiomers of proline (mobile phase containing $CuSO_4$, 10 mM)

FIG. 3 shows the separation profile of the enantiomers of pro line, the mobile phase containing 10 mM of $Cu^{2+}$. The resolution appears to be optimum for a minimal analysis time.

However, the column is not stable over time under these conditions (see below).

2.2.2. Effects of the Type of Metal and of the Associated Inorganic Anion

The effect of the metal ion in central position on the retention of the diastereoisomeric complex formed between the proline and the neamine modified in position 4' was tested by replacing the copper $Cu^{2+}$ by $Ni^{2+}$, $Zn^{2+}$ or $Co^{2+}$ on the enantiomers of proline.

The results show that the metal (0.5 mM) permitting the best enantioselective separation of the D-L proline is copper (α=1.505). The enantioselectivity reduces with zinc (α=1.2). No separation is observed with nickel and with cobalt.

Two inorganic anions, the sulfate ion and the acetate ion, combined with the copper (respectively $CuSO_4$ and $Cu(CH_3COO)_2$ at a concentration of 0.5 mM) were tested on the retention and the enantioselectivity of proline.

The sulfate ion significantly enhances the retention of the enantiomer in series D relative to the acetate ion (3.39 for the sulfate ion versus 2.86 for the acetate ion), but on the other hand does not affect the retention of the enantiomer in series L (1.85 for the sulfate ion and 1.89 for the acetate ion).

The selectivity and the resolution are 1.84 and 2.09 respectively in the presence of the sulfate ion, and reduce to 1.54 and 1.24 in the presence of the acetate ion.

Thus it is preferable therefore to use $Cu^{2+}$ copper ions or $Zn^{2+}$ ions over $Ni^{2+}$ nickel ions or $Co^{2+}$ cobalt ions.

Moreover, it is preferable to use copper sulfate $CuSO_4$ in comparison with copper acetate $Cu(CH_3COO)_2$.

2.2.3. Effect of Temperature

A study was conducted at different temperatures T of between 8° C. to 28° C.

Figure 4:
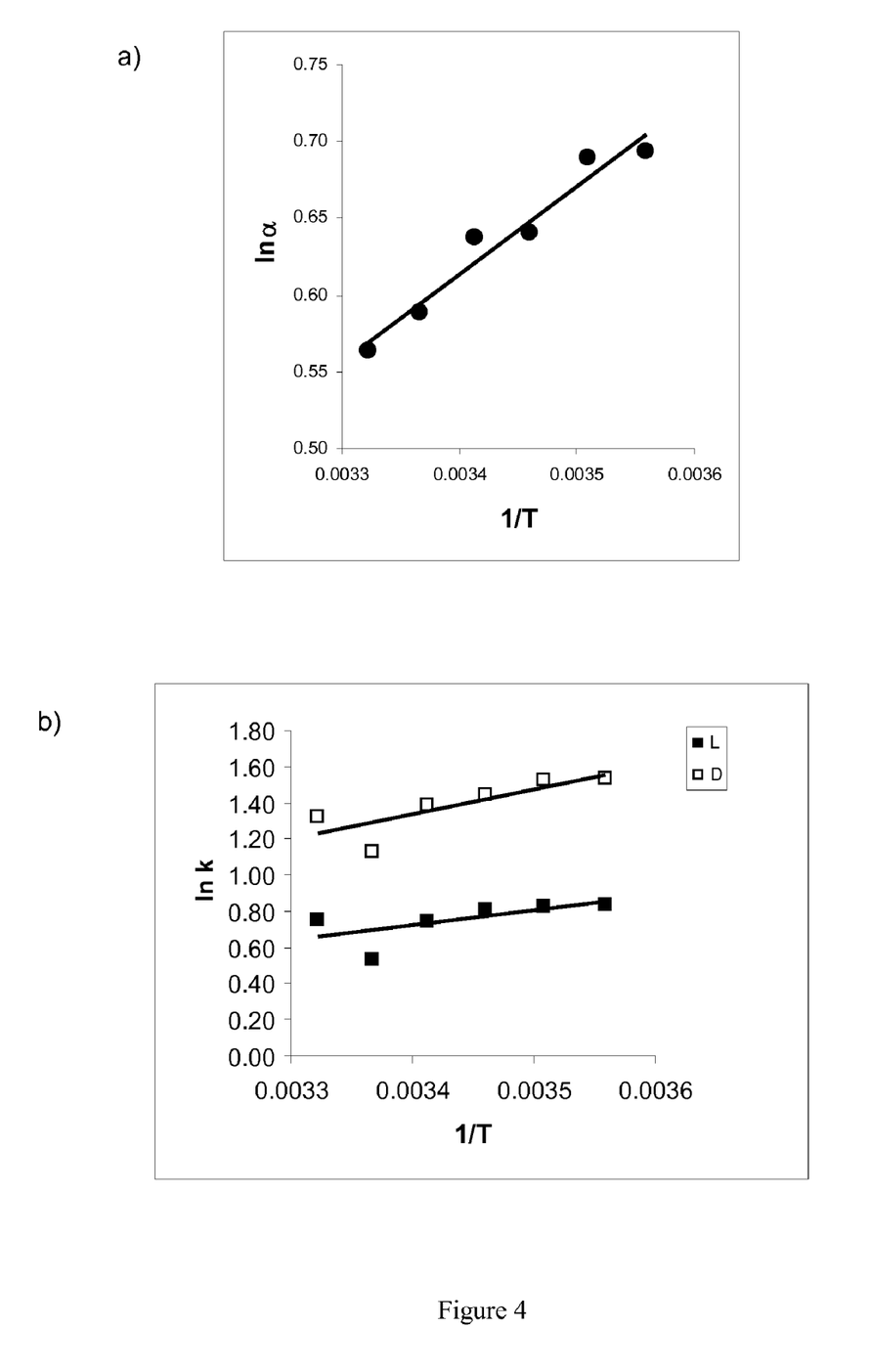
FIG. 4: Variation in ln($\alpha$) (a) and ln k (b) as a function of 1/T

As shown by FIGS. 4a and 4b, the comparison of the retention factors k and of the enantioselectivity α on proline shows that an increase in the temperature T is responsible for a decrease in the fixing of the solute (reduction in the factors k) and a reduction in the enantioselectivity.

Since the resolution is not significantly modified as a function of the temperature, it is preferable to work at 18-35° C., preferably 24-28° C.

2.2.4. Stability of the Column

The stability of the chiral stationary phase (CSP) was evaluated by comparing the enantioselectivity α and the resolution Rs of the enantiomers of proline over 42 days under the same conditions of temperature and mobile phase (MeOH/$H_2O$: 2/98%+$CuSO_4$ at 0.5 mM).

Figure 5:
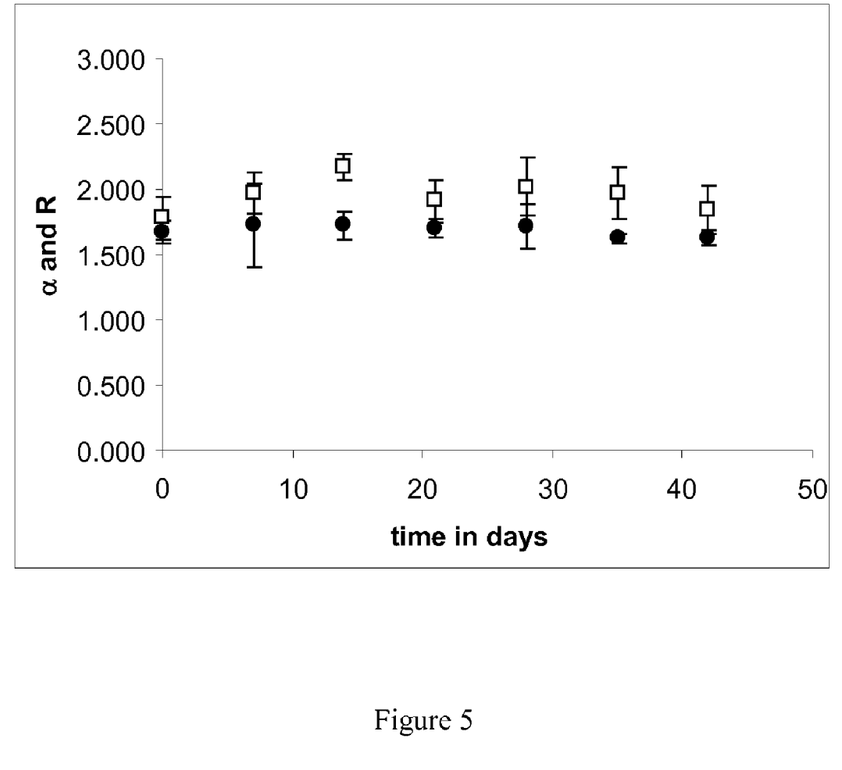
FIG. 5: Stability of the selectivity and of the resolution over time

The results of FIG. 5 show that the CSP is stable over time insofar as the values for selectivity α (black circles) and for resolution (white squares) are stable over time.

Moreover, it is observed that the addition of 2% of methanol to the mobile phase does not affect the fixing of the neamine modified at 4'.

This is because preliminary experiments carried out with 7% of methanol showed a decrease in the chiral discrimination capacities of the column.

The methanol acts directly on the fixing of the modified neamine on the C18 chromatographic support.

In the same way, the use of CSPs in the presence of too high a concentration of $Cu^{2+}$ resulted in a deterioration in the performance of the columns.

2.3. Separation of the Enantiomers of a Plurality of Species

The preliminary results showed that copper, in association with sulfate ions, is the most advantageous metal ion for the separation of the enantiomers of proline, and that its concentration was the dominant factor for modifying the chiral discrimination properties of the neamine. The optimum stability of the column is found at a $Cu^{2+}$ concentration of 0.5 mM.

These conditions are therefore used in the tests which follow.

Under these conditions, the stationary phases produced allowed separation of the enantiomers of around ten pairs of molecules such as amino acids, dipeptides, and nucleosides.

Detection took place in UV at a wavelength of 220 or 236 nm. The temperature of the column was fixed at 20° C. The volume injected was 0.25 μL.

Figure 6:
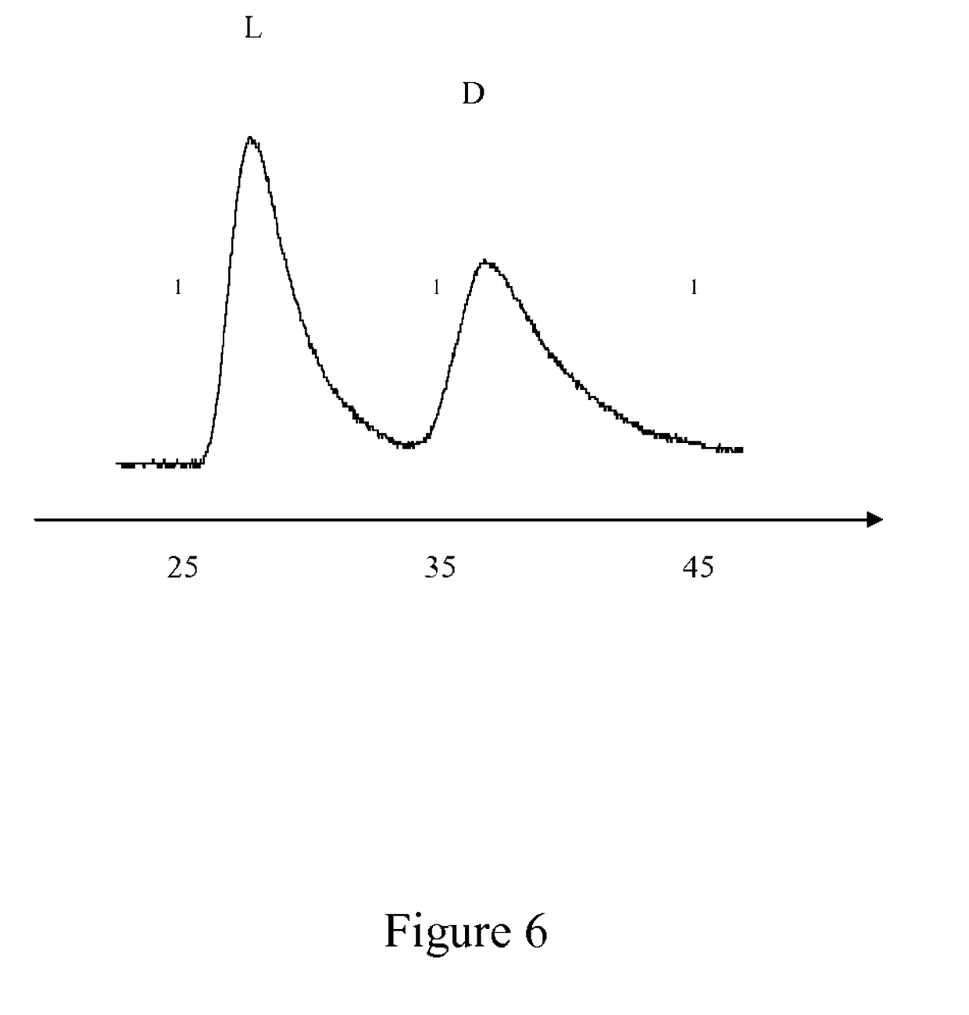
FIG. 6: Separation of the enantiomers of proline on the 4'-mono C18 neamine column Mobile phase: $H_2O$/$CH_3OH$ (98:2, v/v)+$CuSO_4$ 0.5 mM; CSP: 0.3×150 mm, 3 µm; Temperature: 20° C.; Injection volume: 0.25 µL; Concentration for each enantiomer: 0.5 mM; Flow rate: 2 µL/min; Detection: 236 nm.

A representative example of chromatographic separation of the enantiomers of an amino acid (proline) is shown in FIG. 6 for a chiral stationary phase prepared from the neamine derivative alkylated in position 4.

The table below shows the results of the enantiomeric separation of different compounds for two different chiral stationary phases.

TABLE 1

Example of changes in enantioselectivity and in order of elution of the enantiomers as a function of the position of attachment of the hydrocarbon chains to the neamine (5 and 4'). Operating conditions identical for the two stationary phases.

| Compounds | 5-mono C18 neamine α (D > L) | 4'-mono C18 neamine α (D > L) |
|---|---|---|
| Tyrosine | 1.13 | 1.93 |
| α-Methyltyrosine | 1.33 | — |
| Valine | 1.16 | 1.41 |
| Glutamique acid* | 1.13 | 1.22 |
| Isoleucine | 1.16 | 1.43 |
| Leucine | 1.07 | 1.33 |
| Aspartic acid* | 1.09 | — |
| Guanosine | 1.10 | — |
| Deoxyguanosine | 1.06 | — |
| Methionine | — | 1.31 |
| Serine | — | 1.34 |

*Order of elution reversed for these compounds (L > D) for 5-mono C18 neamine.

From table 1 above it is apparent that:
the chiral selectors of the present invention allow separation of amino acids and nucleosides,
the functionalization of the compound at different positions allows
(1) the order of elution of the enantiomers to be reversed (see glutamic acid and aspartic acid), a factor which may prove highly advantageous, especially for determining the enantiomeric purities or for eluting first an enantiomer which is present in a small amount, and
(2) the enantioselectivity of the chiral stationary phase to be modified.

The invention claimed is:

1. A chiral selector for separating the enantiomers of a compound, comprising:
a) at least one compound of formula (I):

in which:
W represents a bond, $CR_4R_5$, $NR_4$, O or S;
X represents $CR_6R_7$, $NR_6$, O or S;
Y represents $CR_8R_9$, $NR_8$, O or S;
Z represents $CR_{10}R_{11}$, $NR_{10}$, O or S;
$R_1$ represents OH or SH; and
$R_2$, $R_3$, $R_4$, $R_5$, $R_6$, $R_7$, $R_8$, $R_9$, $R_{10}$, and $R_{11}$, which are identical or different, represent:
H;
OH, SH;
an amine group;
an alkyl, haloalkyl or heteroalkyl group containing between 1 and 30 carbon atoms in a linear or branched chain;
an alkenyl or alkynyl group containing between 2 to 30 carbon atoms in a linear or branched chain;
one or more cycloalkyl, cycloalkenyl or cycloalkynyl groups containing between 3 to 30 carbon atoms in a linear or branched chain;
one or more aryl or heteroaryl groups containing between 3 to 10 carbon atoms per ring;

an alkaryl or aralkyl group containing between 1 and 30 carbon atoms, the terms aryl and alkyl having the definitions above;

an alkoxy, thioalkyl, sulfonylalkyl or aminoalkyl group containing between 1 and 30 carbon atoms in a linear or branched chain;

an alkoxyalkyl, alkylthioalkyl, alkylsulfonylalkyl or alkylaminoalkyl group containing between 1 and 30 carbon atoms in a linear or branched chain;

one or more heterocyclic groups containing between 5 and 10 carbon atoms per ring;

said groups all being optionally substituted by $R_2$, by one or more nitro, cyano, hydroxyl, carboxyl, carbonyl or amino groups, by one or more halogens or by one or more nitrile, cyanohydrin or aldehyde functions;

the compound of formula (I) being other than chitosan, neomycin, neomycin B, kanamycin A, kanamycin B, neamine, and amikacin;

and b) at least one metal ion.

2. The chiral selector of claim 1, characterized in that it comprises:

a) at least one compound of formula (II):

(II)

in which:

X represents $CR_4R_5$, O, S, $NR_4$, $CR_4R_5$—$CR_6R_7$, $CR_4R_5$—$NR_6$, O—$CR_4R_5$, S—$CR_4R_5$, O—$NR_4$, $NR_4$—$NR_6$ or S—S; and Y, Z, $R_1$, $R_2$, $R_3$, $R_4$, $R_5$, $R_6$, $R_7$, $R_8$, $R_9$, $R_{10}$, and $R_{11}$, which are identical or different, are as defined for formula I;

the compound of formula (II) being other than chitosan, neomycin, neomycin B, kanamycin A, kanamycin B, neamine, and amikacin;

and b) at least one metal ion.

3. The chiral selector of claim 2, characterized in that it comprises:

a) at least one compound of formula (III):

(III)

in which Y, $R_1$, $R_2$, $R_3$, $R_4$, $R_5$, $R_6$, $R_7$, $R_8$, $R_9$, $R_{10}$, and $R_{11}$, which are identical or different, are as defined for formula I;

the compound of formula (III) being other than chitosan, neomycin, neomycin B, kanamycin A, kanamycin B, neamine, and amikacin;

and b) at least one metal ion.

4. The chiral selector of claim 3, characterized in that it comprises:

a) at least one compound of formula (IV) or of formula (V):

(IV)

(V)

in which $R_1$, $R_2$, $R_3$, $R_4$, $R_5$, $R_6$, $R_7$, $R_8$, $R_9$, $R_{10}$, and $R_{11}$, which are identical or different, are as defined for formula I;

the compounds of formula (IV) and (V) being other than chitosan, neomycin, neomycin B, kanamycin A, kanamycin B, neamine, and amikacin;

and b) at least one metal ion.

5. The chiral selector of claim 4, characterized in that it comprises:

a) at least one compound of formula (VI) or a compound of formula (VII):

(VI)

(VII)

in which $R_4$, $R_5$, $R_6$, $R_7$, $R_8$, $R_9$, $R_{10}$, and $R_{11}$, which are identical or different, are as defined for formula I;

the compounds of formula (VI) and (VII) being other than chitosan, neomycin, neomycin B, kanamycin A, kanamycin B, neamine, and amikacin;

and b) at least one metal ion.

6. The chiral selector of claim 1, characterized in that the compound of formula (I) is selected from the following compounds:

glucosamine if R = OH, (IX) = streptamine
if R = H, (IX) = 2-deoxystreptamine aminoglucopyranoside paromamine methyl neobiosamine paromomycin lividomycin tobramycin streptomycin and

-continued (XVII): neamine alkylated in position 5
(XVIII): neamine alkylated in position 6
(XIX): neamine alkylated in position 4′.

7. The chiral selector of claim 1, wherein the metal ion is selected from the following divalent metal ions: $Cu^{2+}$, $Ni^{2+}$, $Zn^{2+}$, $Cd^{2+}$ or $Co^{2+}$.

8. A chiral mobile phase comprising the chiral selector of claim 1 and a migration liquid.

9. A chiral stationary phase comprising the chiral selector of claim 1 and a solid support.

10. The chiral stationary phase of claim 9, wherein the solid support comprises silica particles grafted with alkyl chains.

11. A method of separating the enantiomers of a compound, comprising:
   a) preparing a chiral stationary phase of claim 9,
   b) contacting the enantiomers to be separated with said chiral phase, and
   c) collecting at least one enantiomer of said compound.

12. The method of separating the enantiomers of a compound, of claim 11, wherein said compound is selected from amino acids, peptides, dipeptides, tripeptides, amino alcohols, alcohol acids, and nucleosides.

13. A method of assaying the amount of an enantiomer of a compound in a mixture comprising the enantiomers of that compound, said method comprising:
   a) contacting the enantiomers to be separated with a chiral stationary phase of claim 9,
   b) collecting at least one enantiomer of said compound, and
   c) assaying the enantiomer of said compound.

14. A method of separating the enantiomers of a compound, comprising:
   a) preparing a chiral mobile phase of claim 8,
   b) contacting the enantiomers to be separated with said chiral phase, and
   c) collecting at least one enantiomer of said compound.

15. A method of assaying the amount of an enantiomer of a compound in a mixture comprising the enantiomers of that compound, said method comprising:
   a) contacting the enantiomers to be separated with a chiral mobile phase of claim 8,
   b) collecting at least one enantiomer of said compound, and
   c) assaying the enantiomer of said compound.

* * * * *